(12) United States Patent
Zhang et al.

(10) Patent No.: US 12,160,890 B2
(45) Date of Patent: Dec. 3, 2024

(54) TECHNIQUES FOR SIGNALING A RESTRICTED RESOURCE

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/645,171

(22) Filed: Dec. 20, 2021

(65) Prior Publication Data

US 2023/0199840 A1   Jun. 22, 2023

(51) Int. Cl.
*H04W 74/0816* (2024.01)
*H04W 24/10* (2009.01)
*H04W 48/06* (2009.01)
*H04W 74/00* (2009.01)
*H04B 17/345* (2015.01)

(52) U.S. Cl.
CPC ....... *H04W 74/0816* (2013.01); *H04W 24/10* (2013.01); *H04W 48/06* (2013.01); *H04W 74/002* (2013.01); *H04B 17/345* (2015.01)

(58) Field of Classification Search
None
See application file for complete search history.

(56) References Cited

U.S. PATENT DOCUMENTS

| 11,330,669 B2* | 5/2022 | Lee | H04W 88/10 |
| 2018/0359700 A1* | 12/2018 | Sasanapuri | H04L 5/0057 |
| 2020/0145153 A1* | 5/2020 | Ma | H04L 5/0032 |
| 2020/0295800 A1* | 9/2020 | Wang | H04B 7/024 |
| 2021/0321250 A1* | 10/2021 | Ryu | H04W 4/08 |
| 2022/0095240 A1* | 3/2022 | Ying | H04W 52/367 |
| 2022/0201524 A1* | 6/2022 | Ying | H04W 74/0866 |
| 2022/0303108 A1* | 9/2022 | Faxér | H04L 5/1461 |
| 2023/0155711 A1* | 5/2023 | Zhang | H04W 72/541 455/63.1 |
| 2023/0189315 A1* | 6/2023 | Haustein | H04W 24/02 370/252 |
| 2023/0199816 A1* | 6/2023 | Zhang | H04W 72/541 370/396 |
| 2023/0327787 A1* | 10/2023 | Bai | H04B 17/345 370/252 |

FOREIGN PATENT DOCUMENTS

| WO | WO-2018202956 A1 * | 11/2018 | H04B 7/2656 |
| WO | WO-2020057726 A1 * | 3/2020 | H04L 5/0032 |
| WO | WO-2022238246 A1 * | 11/2022 | |

* cited by examiner

*Primary Examiner* — Anh Vu H Ly
(74) *Attorney, Agent, or Firm* — Dalei Dong; Harrity & Harrity, LLP

(57) ABSTRACT

Various aspects of the present disclosure generally relate to wireless communication. In some aspects, a first network node may identify interference associated with a first direction on a resource. The first network node may transmit, to a second network node in a time window associated with the resource, an indication that the resource is restricted with regard to communications, by the second network node, in a second direction on the resource, wherein the second direction is opposite the first direction. The first network node may communicate based at least in part on the indication. Numerous other aspects are described.

28 Claims, 10 Drawing Sheets

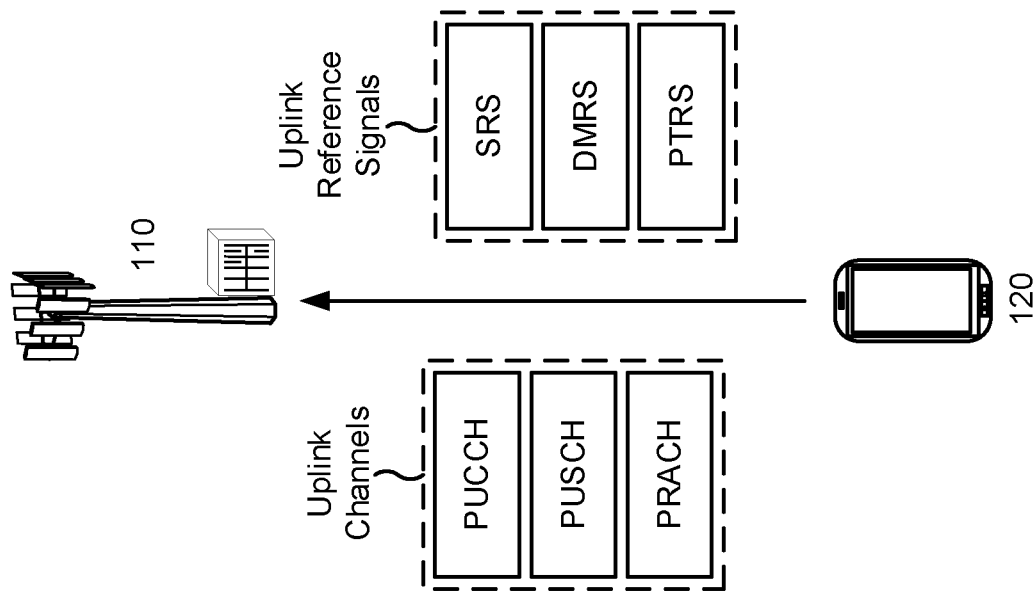
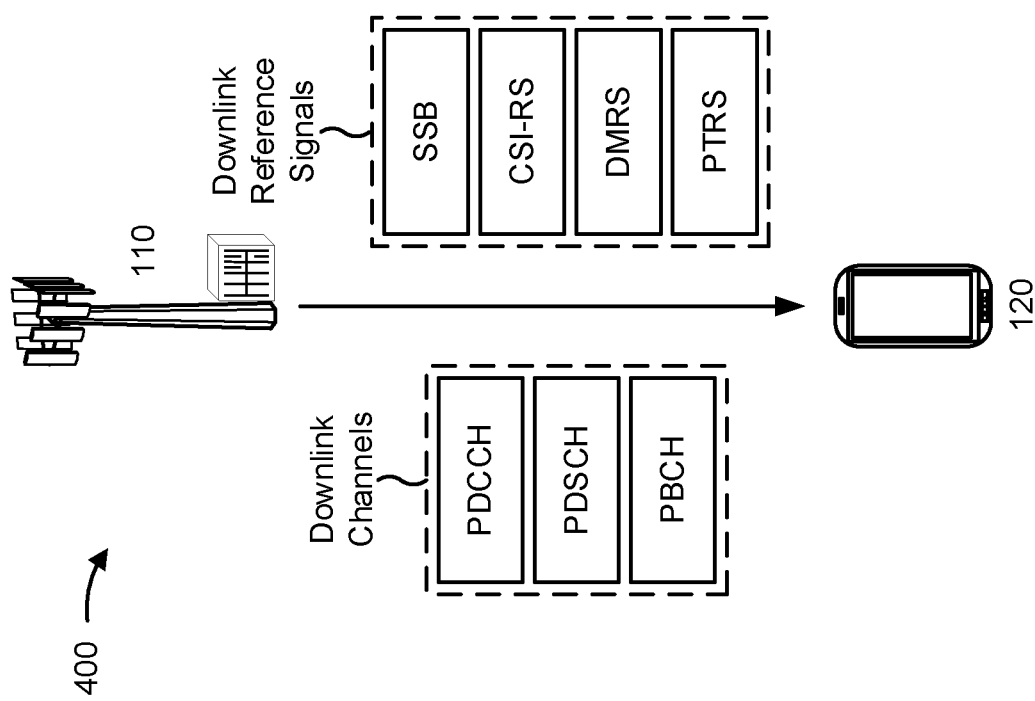
FIG. 4

TECHNIQUES FOR SIGNALING A RESTRICTED RESOURCE

FIELD OF THE DISCLOSURE

Aspects of the present disclosure generally relate to wireless communication and to techniques and apparatuses for signaling a restricted resource.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first network node. The method may include identifying interference associated with a first direction on a resource. The method may include transmitting, to a second network node in a time window associated with the resource, an indication that the resource is restricted with regard to communications, by the second network node, in a second direction on the resource, wherein the second direction is opposite the first direction. The method may include communicating based at least in part on the indication.

Some aspects described herein relate to a method of wireless communication performed by a first network node. The method may include receiving, from a second network node in a time window associated with a resource, an indication that the resource is restricted with regard to communications, by the first network node, in a direction on the resource. The method may include communicating on the resource based at least in part on the indication.

Some aspects described herein relate to a method of wireless communication performed by a user equipment (UE). The method may include receiving, from a first network node, an indication that a resource is restricted with regard to communications, by a second network node, in a direction on the resource. The method may include relaying the indication to the second network node.

Some aspects described herein relate to an apparatus of a first network node for wireless communication. The apparatus may include a memory and one or more processors coupled to the memory. The apparatus may be configured to identify interference associated with a first direction on a resource. The apparatus may be configured to transmit, to a second network node in a time window associated with the resource, an indication that the resource is restricted with regard to communications, by the second network node, in a second direction on the resource, wherein the second direction is opposite the first direction. The apparatus may be configured to communicate based at least in part on the indication.

Some aspects described herein relate to an apparatus of a first network node for wireless communication. The apparatus may include a memory and one or more processors coupled to the memory. The apparatus may be configured to receive, from a second network node in a time window associated with a resource, an indication that the resource is restricted with regard to communications, by the first network node, in a direction on the resource. The apparatus may be configured to communicate on the resource based at least in part on the indication.

Some aspects described herein relate to an apparatus of a UE for wireless communication. The apparatus may include a memory and one or more processors coupled to the memory. The apparatus may be configured to receive, from a first network node, an indication that a resource is restricted with regard to communications, by a second network node, in a direction on the resource. The apparatus may be configured to relay the indication to the second network node.

Some aspects described herein relate to a non-transitory computer-readable medium that stores a set of instructions for wireless communication by a first network node. The set of instructions, when executed by one or more processors of the first network node, may cause the first network node to identify interference associated with a first direction on a resource. The set of instructions, when executed by one or more processors of the first network node, may cause the first network node to transmit, to a second network node in a time window associated with the resource, an indication that the resource is restricted with regard to communications, by the second network node, in a second direction on the resource, wherein the second direction is opposite the first direction. The set of instructions, when executed by one or more processors of the first network node, may cause the first network node to communicate based at least in part on the indication.

Some aspects described herein relate to a non-transitory computer-readable medium that stores a set of instructions for wireless communication by a first network node. The set of instructions, when executed by one or more processors of the first network node, may cause the first network node to receive, from a second network node in a time window associated with a resource, an indication that the resource is restricted with regard to communications, by the first network node, in a direction on the resource. The set of instructions, when executed by one or more processors of the first network node, may cause the first network node to communicate on the resource based at least in part on the indication.

Some aspects described herein relate to a non-transitory computer-readable medium that stores a set of instructions for wireless communication by a UE. The set of instructions, when executed by one or more processors of the UE, may cause the UE to receive, from a first network node, an indication that a resource is restricted with regard to communications, by a second network node, in a direction on the resource. The set of instructions, when executed by one or more processors of the UE, may cause the UE to relay the indication to the second network node.

Some aspects described herein relate to an apparatus for wireless communication. The apparatus may include means for identifying interference associated with a first direction on a resource. The apparatus may include means for transmitting, to a second network node in a time window associated with the resource, an indication that the resource is restricted with regard to communications, by the second network node, in a second direction on the resource, wherein the second direction is opposite the first direction. The apparatus may include means for communicating based at least in part on the indication.

Some aspects described herein relate to an apparatus for wireless communication. The apparatus may include means for receiving, from a second network node in a time window associated with a resource, an indication that the resource is restricted with regard to communications, by the first network node, in a direction on the resource. The apparatus may include means for communicating on the resource based at least in part on the indication.

Some aspects described herein relate to an apparatus for wireless communication. The apparatus may include means for receiving, from a first network node, an indication that a resource is restricted with regard to communications, by a second network node, in a direction on the resource. The apparatus may include means for relaying the indication to the second network node.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
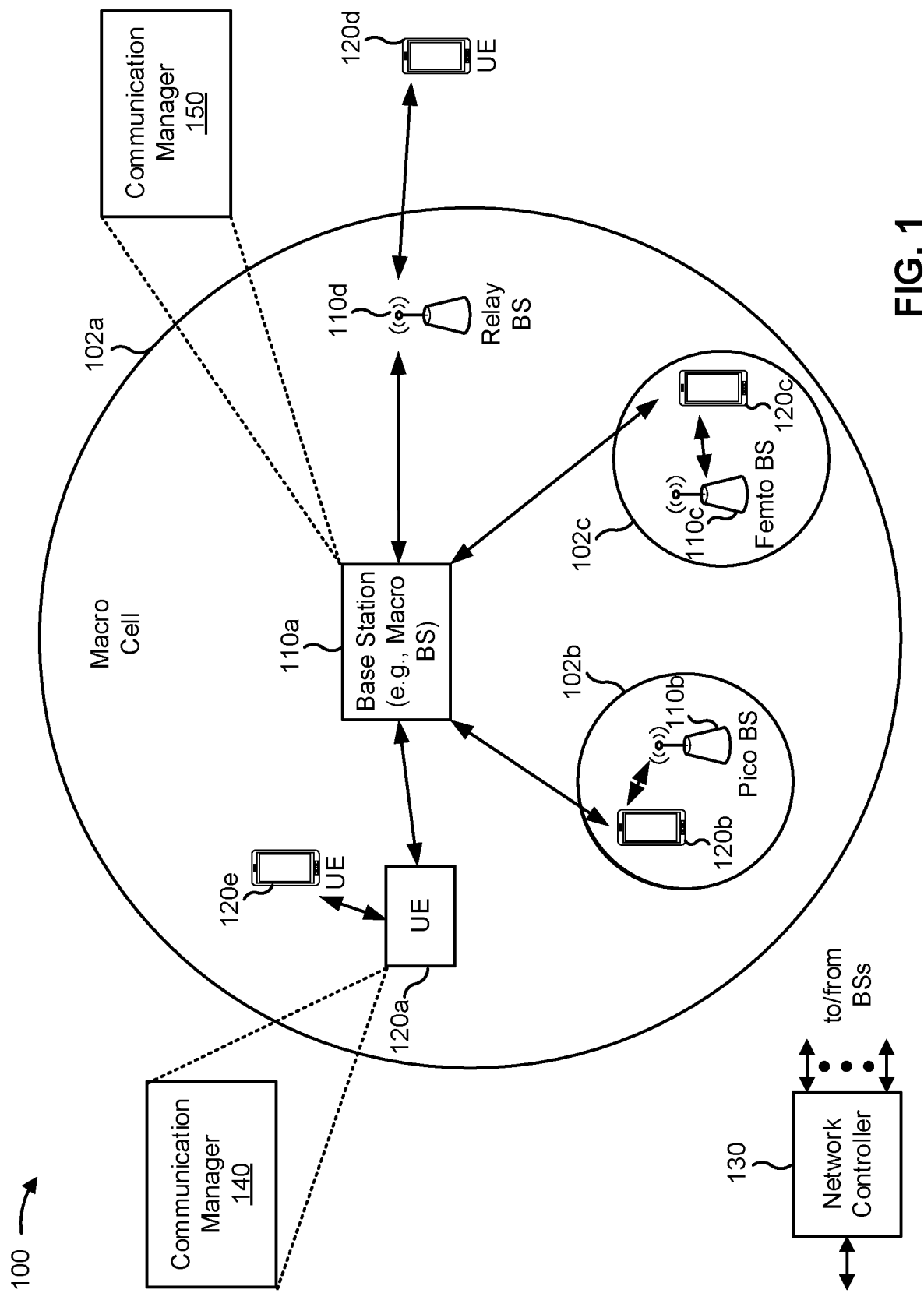
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the first network node may include a communication manager 150. As described in more detail elsewhere herein, the communication manager 150 may identify interference associated with a first direction on a resource; transmit, to a second network node in a time window associated with the resource, an indication that the resource is restricted with regard to communications, by the second network node, in a second direction on the resource, wherein the second direction is opposite the first direction; and communicate based at least in part on the indication. Additionally, or alternatively, the communication manager 150 may perform one or more other operations described herein.

In some aspects, the communication manager 150 may receive, from a second network node in a time window associated with a resource, an indication that the resource is restricted with regard to communications, by the first network node, in a direction on the resource; and communicate on the resource based at least in part on the indication. Additionally, or alternatively, the communication manager 150 may perform one or more other operations described herein.

In some aspects, the UE 120 may include a communication manager 140. As described in more detail elsewhere herein, the communication manager 140 may receive, from a first network node, an indication that a resource is restricted with regard to communications, by a second network node, in a direction on the resource; and relay the indication to the second network node. Additionally, or alternatively, the communication manager 140 may perform one or more other operations described herein.

As indicated above, FIG. 1 is provided as an example. Other examples may differ from what is described with regard to FIG. 1.

Figure 2:
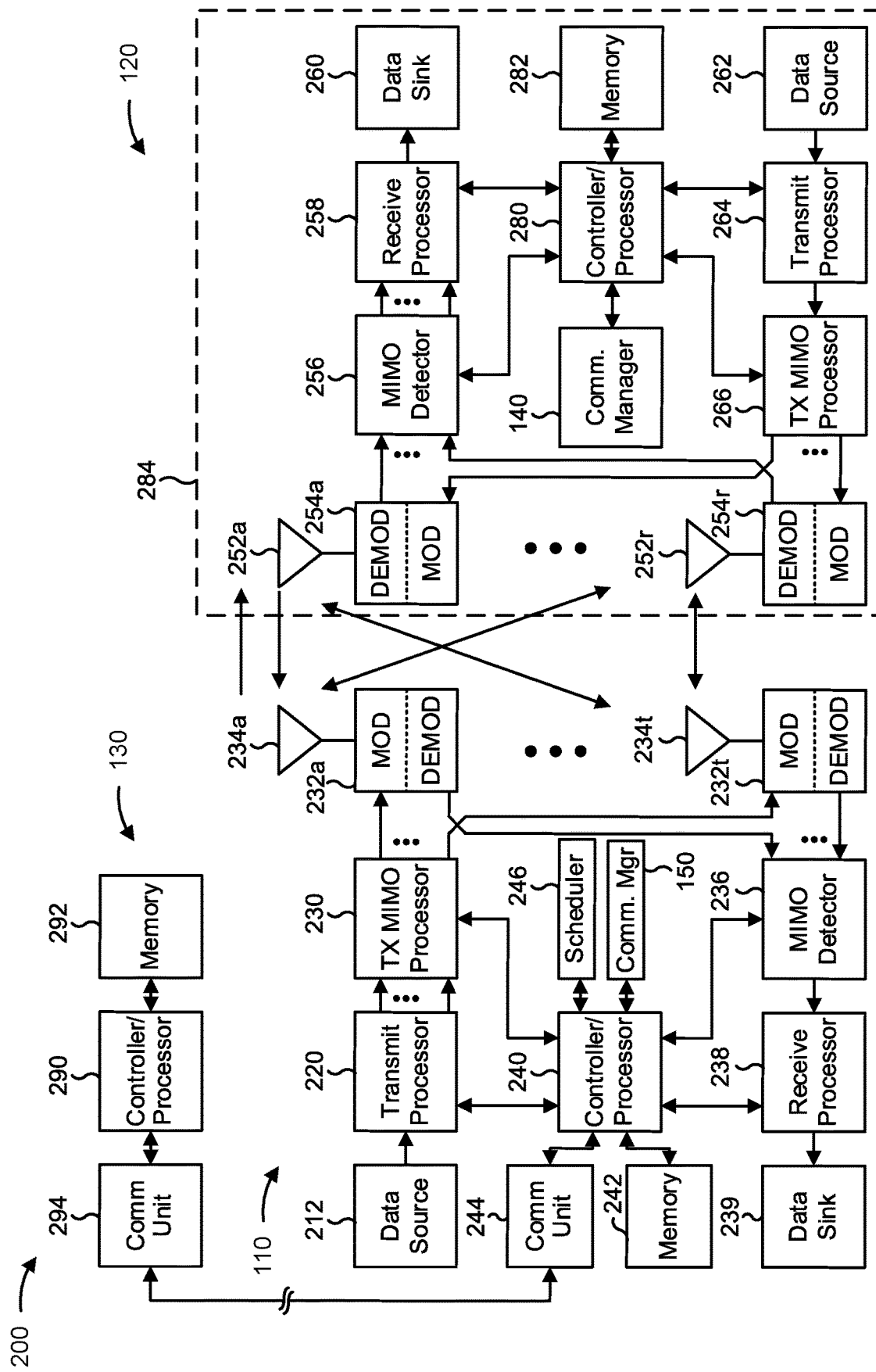
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with signaling of a restricted resource, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first network node (e.g., base station 110) includes means for identifying interference associated with a first direction on a resource; means for transmitting, to a second network node in a time window associated with the resource, an indication that the resource is restricted with regard to communications, by the second network node, in a second direction on the resource, wherein the second direction is opposite the first direction; and/or means for communicating based at least in part on the indication. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the first network node includes means for receiving, from a second network node in a time window associated with a resource, an indication that the resource is restricted with regard to communications, by the first network node, in a direction on the resource; and/or means for communicating on the resource based at least in part on the indication. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a UE includes means for receiving, from a first network node, an indication that a resource is restricted with regard to communications, by a second network node, in a direction on the resource; and/or means for relaying the indication to the second network node. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3B:
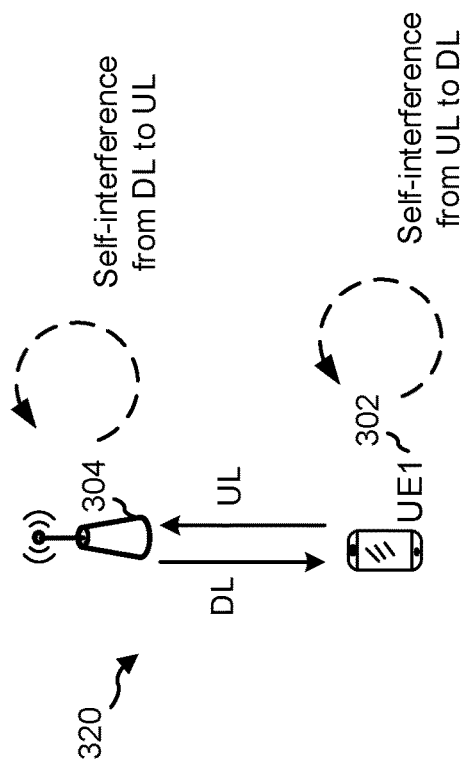
FIGS. 3A-3C are diagrams illustrating examples of full duplex (FD) communication in accordance with the present disclosure.
Figure 3C:
Figure 3A:
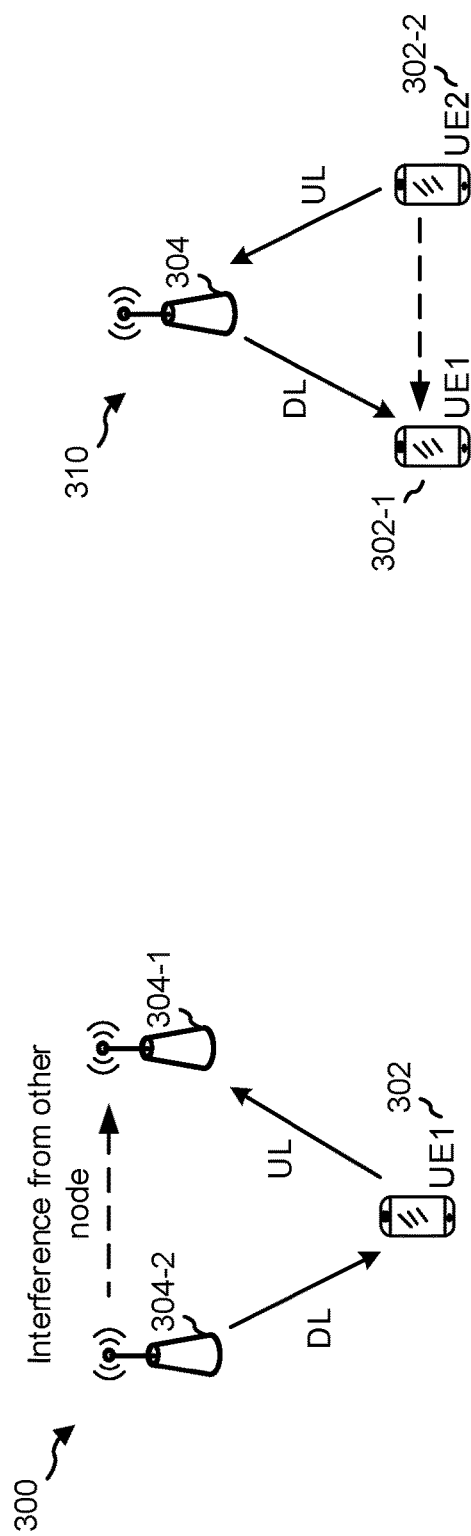

FIGS. 3A-3C are diagrams illustrating examples 300, 310, 320 of full duplex (FD) communication in accordance with the present disclosure. An FD communication is a communication that utilizes overlapped time resources at a single node (such as a UE or a base station) for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG), as described in more detail in connection with FIG. 4.

The example 300 of FIG. 3A includes a UE1 302 and two base stations (e.g., TRPs) 304-1, 304-2, wherein the UE1 302 is sending UL transmissions to base station 304-1 and is receiving DL transmissions from base station 304-2. In the example 300 of FIG. 3A, FD is enabled for the UE1 302, but not for the base stations 304-1, 304-2. Thus, the base stations 304-1 and 304-2 are half duplex (HD) base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UE1 302-1 and UE2 302-2. Thus, the UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304. In the example 320 of FIG. 3C, the UE1 302 and the base station 304 communicate using a beam pair. A beam pair may include a downlink beam and an uplink beam. For example, a UE1 302 may use a beam pair that includes a downlink beam (that is, a receive beam) at the UE1 302 and an uplink beam (that is, a transmit beam) at the UE1 302 to communicate with the base station 304. The base station 304 may use a downlink beam (that is, a transmit beam) at the base station 304 to transmit communications received via the UE1 302's downlink beam, and may use an uplink beam (that is, a receive beam) at the base station 304 to receive communications transmitted via the UE1 302's uplink beam.

In FIGS. 3A-3C, interference is indicated by dashed lines. Interference can occur between nodes of examples 300, 310, 320 (referred to as "cross-link interference" (CLI)). Examples of CLI are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 302 (from an uplink transmission to a downlink reception) and at a BS 304 (from a downlink transmission to an uplink reception) are shown in FIG. 3C. It should be noted that the above-described CLI and self-interference conditions can occur in HD deployments and in FD deployments.

As indicated above, FIGS. 3A-3C are provided as one or more examples. Other examples may differ from what is described with regard to FIGS. 3A-3C.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

There are various resources (e.g., time and frequency (time/frequency) resources) in which FD communication may be undesirable. As described above with regard to FIGS. 3A-3C, FD communication may be associated with some amount of interference. Therefore, resources relating to identifying interference, radio link monitoring (RLM), beam failure recovery (BFR), performing measurements, ultra-reliable low latency communication (URLLC), slot aggregation, or the like, may be more significantly impacted by FD communication than other resources. For example, a resource associated with initial access, such as an SSB, a common search space, a remaining minimum system information message, a paging PDSCH, or a random access channel (RACH) occasion, may be negatively impacted by FD communication, which may be exacerbated if no CLI measurement is performed at an idle UE. As another example, RLM and BFR resources, such as resources for RLM/BFD reference signals, a PUCCH for BFR, and a synchronization signal for BFR, may be negatively impacted by FD communication. As yet another example, measurement-related resources, such as for a tracking reference signal (TRS), a PTRS, a PRS, or a reference signal for beam management (BM) or CSI, may be negatively impacted by FD communication. As still another example, semi-persistent scheduling (SPS) or configured grant (CG) resources, such as those associated with URLLC communication, may be negatively impacted by FD communication. As another example, resources associated with slot aggregation may be negatively impacted by FD communication.

Furthermore, in some examples, communication in a first direction (e.g., the uplink direction or the downlink direction) may be more important than communication in a second direction (e.g., the downlink direction or the uplink direction). For example, a resource relating to initial access may require more reliability or less interference in the downlink direction than in the uplink direction. However, different base stations may not coordinate regarding usage of resources. For example, different base stations may not coordinate whether a given resource (which may be negatively impacted by FD communication, as described above) is used for FD communication. As another example, different base stations may not coordinate flexible time division duplexing (TDD) resource usage, which can lead to usage of a particular resource in full-duplex. The lack of coordination of resource usage between base stations may lead to suboptimal resource usage, may introduce interference on certain resources, and may degrade throughput.

Some techniques and apparatuses described herein provide an indication, by a first network node (e.g., a victim network node, base station 110), for a second network node (e.g., an aggressor network node, base station 110) not to communicate in a particular resource. For example, the indication may indicate that the second network node should not communicate in a particular direction on the particular resource. As a more particular example, if the second network node's uplink reception is interfering or may interfere with downlink transmission of the first network node in a particular resource, the first network node may provide an indication for the second network node to not communicate in the uplink direction in the particular resource. In this way, resource usage is improved, interference is reduced, and throughput is increased. Furthermore, by indicating a particular direction that is restricted for the second network node's communication, reduction in throughput at the second network node is mitigated relative to restricting the second network node's communication in all directions.

As indicated above, FIG. 4 is provided as an example. Other examples may differ from what is described with regard to FIG. 4.

Figure 5:
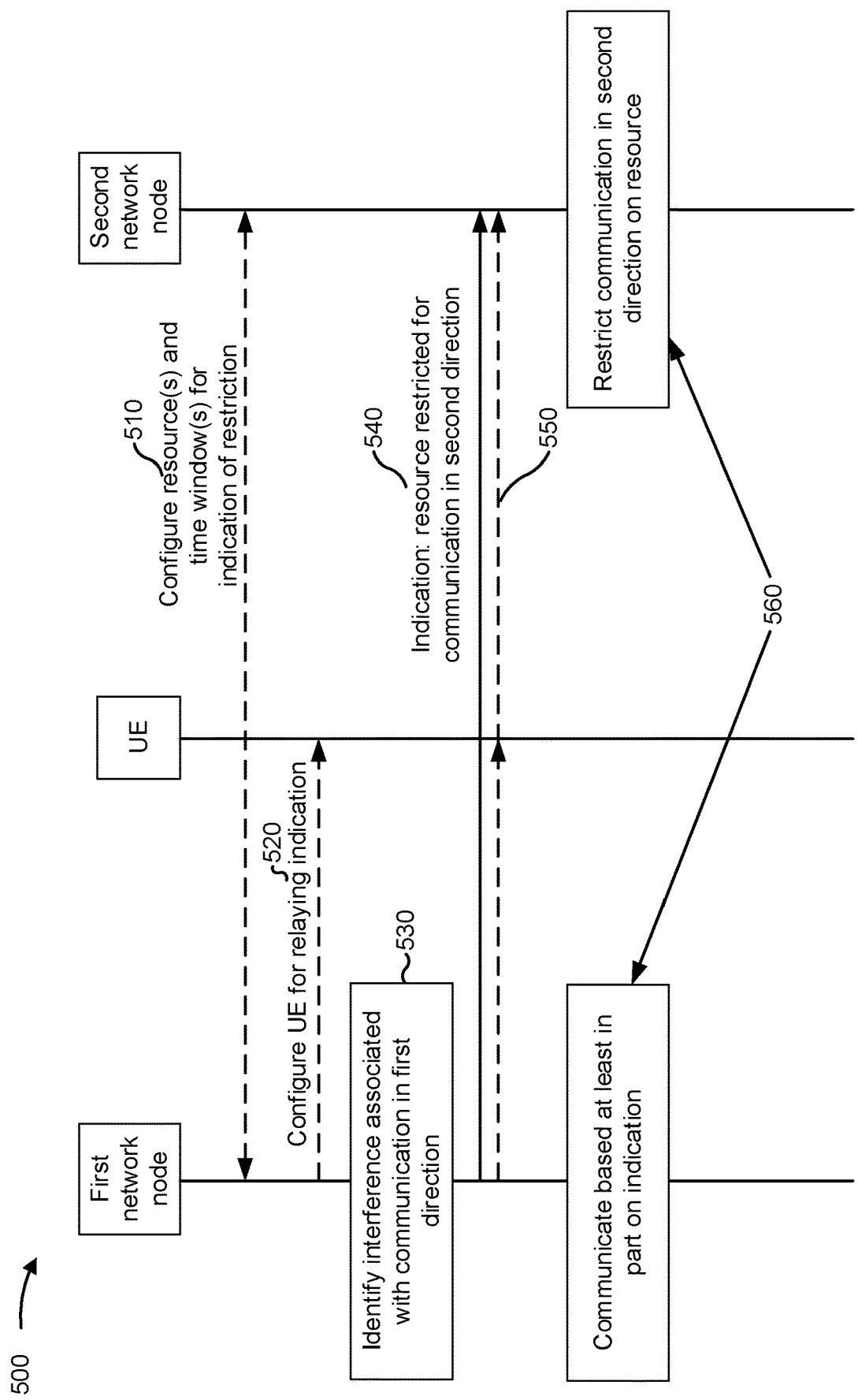
FIG. 5 is a diagram illustrating an example of signaling associated with indication of a restricted resource, in accordance with the present disclosure.

FIG. 5 is a diagram illustrating an example 500 of signaling associated with indication of a restricted resource, in accordance with the present disclosure. As shown, example 500 includes a first network node (e.g., base station 110), a second network node (e.g., base station 110), and a UE (e.g., UE 120).

As shown in FIG. 5, and by reference number 510, the first network node and the second network node may configure one or more resources. For example, the first network node and/or the second network node may configure one or more resources as resources for which communication in a particular direction (e.g., the uplink direction and/or the downlink direction) can be restricted. In some aspects, the configuration of the one or more resources may be implicit. For example, there may be certain types of resources (e.g., resources associated with initial access, measurement resources, BFR/RLM resources, URLLC communication resources, and so on) for which communication in a particular direction can be restricted. When a resource of the certain types of resources is configured, the resource may therefore be configured such that communication in a particular direction on the resource can be restricted. Thus, resources for which communication in a particular direction can be restricted may be pre-determined.

As further shown, the first network node and/or the second network node may configure a time window associated with a resource. The time window may be a time period in which an indication associated with the resource can be transmitted. If an indication is received in the time window associated with the resource, the second network node may restrict communication in one or more directions based at least in part on the indication, as described elsewhere herein. In some aspects, the time window may be specific to a resource. In some aspects, the time window may be associated with multiple resources. In some aspects, the time window may occur a defined length of time before a resource. For example, the first network node and/or the second network node may configure a time offset that indicates a time associated with the time window relative to a time associated with the resource.

As shown by reference number 520, the first network node may optionally configure the UE to relay the indication. For example, in some aspects, the UE may relay an indication to the second network node. In some aspects, the first network node may configure the UE to relay the indication to the second network node. For example, the first network node may provide a resource allocation for relaying the indication (e.g., for receiving the indication and/or transmitting the indication). As another example, the first network node may provide information indicating a time window associated with a resource to the UE, such that the UE can relay the indication within the time window. As yet another example, the first network node may provide information identifying the second network node and/or information used by the UE to communicate with the second network node (such as to relay the indication to the second network node).

As shown by reference number 530, the first network node may identify interference associated with a communication in a first direction. The first direction may be one of a downlink direction or an uplink direction. A downlink transmission is a communication in the downlink direction. An uplink transmission (e.g., an uplink reception by the first network node) is a communication in the uplink direction. In some aspects, the first network node may sense interference associated with the communication in the first direction. For example, the first network node may sense CLI from the second network node. If the CLI satisfies a threshold, the first network node may identify interference associated with the communication in the first direction. In some aspects, the first network node may identify interference based at least in part on a resource type of a resource. For example, the first network node may determine that a particular resource is associated with a resource type for which interference is to be avoided (as described above). In this example, the first network node may transmit an indication relating to the particular resource such that interference in the particular resource is avoided. In some aspects, the first network node may identify predicted interference associated with a resource, such as based at least in part on a resource type of the resource (as described above), past interference with the resource, information received from the second network node, or the like. In some aspects, the first network node may identify the interference when a measured uplink out-of-cell interference (e.g., interference associated with the second network node and/or one or more other network nodes) satisfies a threshold.

As shown by reference number 540, the first network node may provide, to the second network node, an indication that communication in the second direction on the resource should be restricted. For example, based at least in part on identifying the interference (e.g., predicting the interference, identifying the resource as a particular resource type, or the like), the first network node may dynamically signal the indication. The indication may indicate that communication in a second direction on the resource is to be restricted. As used herein, if communication in a particular direction at a particular network node is "restricted," the particular network node may not transmit or receive communications in the particular direction in a corresponding resource, or may transmit or receive such communications using a power backoff. For example, if the particular direction is a downlink direction, the particular network node may communicate only in the uplink direction or may perform downlink communications using a power backoff.

In some aspects, the indication is transmitted over the air. For example, the indication may be transmitted as a reference signal. In some aspects, the indication may identify the first network node. For example, the indication may include an identifier of the first network node (e.g., a cell identifier or the like). In some aspects, the indication may identify the first network node based at least in part on a time window in which the indication is transmitted. For example, the time window may be specific to the first network node, and any indication transmitted in the time window may be associated with the first network node. In some other aspects, the time window may be common to a plurality of network nodes (e.g., a plurality of cells), such as all network nodes or all network nodes that support restriction of communication in a particular direction.

In some aspects, the indication is transmitted via a backhaul between the first network node and the second network node. Transmitting the indication via the backhaul may improve reliability and reduce radio resource usage where the backhaul is sufficient to carry the indication. In some aspects, the first network node may transmit the indication over the air based at least in part on whether there is a backhaul connection between the first network node and the second network node. For example, if there is a backhaul connection (e.g., an ideal backhaul, a backhaul that provides at least a threshold reliability and/or throughput), then the first network node may transmit the indication via the backhaul. If there is not a backhaul connection, then the first network node may transmit the indication over the air.

The indication may be transmitted in a time window associated with the resource, as described above in connection with reference number 510. The second network node may monitor the time window. If the second network node detects the indication in the time window, the second network node may restrict communication in a particular direction (which may, or may not, be indicated by the indication) in the resource.

As shown by reference number 550, in some aspects, the first network node may provide the indication to the second network node via the UE. For example, the UE may relay the indication from the first network node to the second network node. Thus, coverage of the indication may be extended, and indication of restricted directions for communications may be enabled for network nodes having low transmit power.

In some aspects, the indication may be provided via control information. For example, the first network node may transmit, to the UE, downlink control information (DCI). The DCI may be or may carry the indication. The UE may transmit, to the second network node, uplink control information (UCI). The UCI may be or may carry the indication. Thus, relaying of the indication via the UE is enabled, which improves coverage of the indication.

In some aspects, the indication may be provided via control information. For example, the first network node may transmit, to the UE, a downlink MAC control element (MAC-CE). The downlink MAC-CE may be or may carry the indication. The UE may transmit, to the second network node, an uplink MAC-CE. The uplink MAC-CE may be or may carry the indication. Thus, relaying of the indication via the UE is enabled, which improves coverage of the indication.

In some aspects, the indication may identify the second network node. For example, the indication may be directed to the second network node. In some aspects, the indication may identify the second network node based at least in part on a reference signal sequence (such as a physical cell identifier (PCI) sequence) associated with the second network node. In some aspects, the indication may carry information identifying the second network node. For example, if the indication is or is carried by DCI, UCI, or a MAC-CE, the DCI, UCI, or MAC-CE may indicate an identifier of the second network node (e.g., a gNB identifier).

In some aspects, the indication may include information identifying a suggested backoff power for the second network node. In such aspects, the second network node may perform communications in the direction associated with the indication using the backoff power (e.g., using a reduced transmit power), which enables communication in the direction while reducing interference at the first network node. In some aspects, the indication may include information identifying a suggested beam (or one or more suggested beams) for the second network node. For example, the first network node may provide information indicating a beam that is associated with lower than a threshold level of interference, no interference, lower than a threshold predicted level of interference, or the like. In such aspects, the second network node may perform communications in the direction associated with the indication using the suggested beam (or set of beams), which enables communication in the direction without a backoff power and while reducing interference at the first network node.

In some aspects, the first network node may select the UE for relaying. For example, the first network node may configure (e.g., pre-configure) the UE to relay the indication, as described in connection with reference number 520. As another example, the first network node may select any UE to relay the indication (e.g., any UE connected to the second network node, any UE within a coverage area of the first network node, or the like). As yet another example, the first network node may select the UE based at least in part on a rule. For example, the rule may be preconfigured for the first network node (e.g., having a shared and/or common definition between at least two devices, configured by a manufacturer, configured by a network operator, or the like), or may be defined by a wireless communication specification. In some aspects, the first network node may select the UE from UEs in a coverage range of the second network node (e.g., the coverage range may be based at least in part on a signal strength of the second network node, a distance from the second network node, a zone associated with the second network node, a cell associated with the second network node, or the like). In some aspects, the first network node may select the UE based at least in part on traffic at the UE. For example, the first network node may select the UE if traffic at the UE satisfies a threshold (e.g., is lower than the threshold), if the UE is traffic free during a time window (e.g., a time window in which the indication is received by the UE and a time window in which the indication is transmitted by the UE), or the like.

As shown by reference number 560, the first network node and the second network node may communicate. For example, the first network node and/or the second network node may communicate based at least in part on the indication. For example, the first network node may transmit or receive a communication in the resource associated with the indication. As another example, the second network node may communicate using a restriction indicated by the indication. For example, the second network node may not transmit or receive a communication in a direction associated with the indication. As another example, the second network node may transmit or receive a communication in the direction using a backoff power and/or a beam (or set of beams) indicated by the indication. In this way, interference is reduced at the first network node. As yet another example, the second network node may terminate transmission in the indicated direction on the restricted resource (such as within a symbol) for a duration. In some aspects, the duration may last until a next time window (e.g., a next time window associated with the restricted resource or another time window).

In some aspects, the second network node may cease restriction of communication on a resource. For example, the second network node may cease restriction of communication on the resource (e.g., may resume communication in a direction indicated by the indication) after a length of time has elapsed. As another example, the second network node may cease restriction of communication on a resource based at least in part on a second indication, received from the first network node, indicating that the restriction is to be ceased.

As indicated above, FIG. 5 is provided as an example. Other examples may differ from what is described with regard to FIG. 5.

Figure 6:
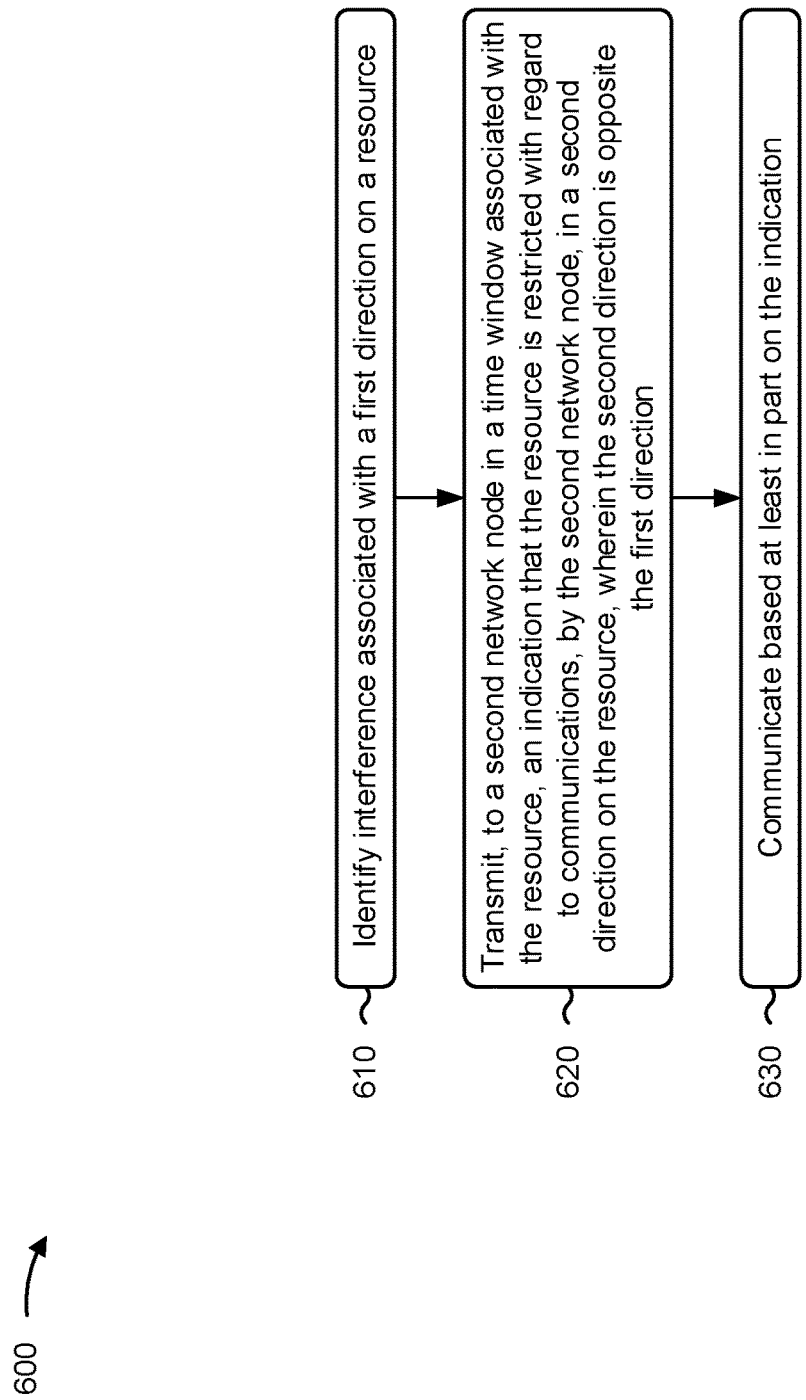
FIGS. 6 and 7 are diagrams illustrating example processes performed, for example, by a network node, in accordance with the present disclosure.

FIG. 6 is a diagram illustrating an example process 600 performed, for example, by a network node, in accordance with the present disclosure. Example process 600 is an example where a first network node (e.g., base station 110, base station 304, the first network node of FIG. 5) performs operations associated with techniques for signaling a restricted resource.

As shown in FIG. 6, in some aspects, process 600 may include identifying interference associated with a first direction on a resource (block 610). For example, the first network node (e.g., using communication manager 150 and/or identification component 908, depicted in FIG. 9) may identify interference associated with a first direction on a resource, as described above.

As further shown in FIG. 6, in some aspects, process 600 may include transmitting, to a second network node in a time window associated with the resource, an indication that the resource is restricted with regard to communications, by the second network node, in a second direction on the resource, wherein the second direction is opposite the first direction (block 620). For example, the first network node (e.g., using communication manager 150 and/or transmission component 904, depicted in FIG. 9) may transmit, to a second network node in a time window associated with the resource, an indication that the resource is restricted with regard to communications, by the second network node, in a second direction on the resource, wherein the second direction is opposite the first direction, as described above.

As further shown in FIG. 6, in some aspects, process 600 may include communicating based at least in part on the indication (block 630). For example, the first network node (e.g., using communication manager 150 and/or transmission component 904, depicted in FIG. 9) may communicate based at least in part on the indication, as described above.

Process 600 may include additional aspects, such as any single aspect or any combination of aspects described below and/or in connection with one or more other processes described elsewhere herein.

In a first aspect, process 600 includes performing (e.g., using communication manager 150 and/or reception component 902) an interference measurement on the resource, wherein identifying the interference is based at least in part on the interference measurement.

In a second aspect, alone or in combination with the first aspect, the indication is a reference signal.

In a third aspect, alone or in combination with one or more of the first and second aspects, the indication indicates an identifier of the first network node.

In a fourth aspect, alone or in combination with one or more of the first through third aspects, the time window is specific to the first network node.

In a fifth aspect, alone or in combination with one or more of the first through fourth aspects, the time window is common to a plurality of nodes that includes the first network node.

In a sixth aspect, alone or in combination with one or more of the first through fifth aspects, process 600 includes transmitting another indication indicating that the resource can be used for the communications in the second direction.

In a seventh aspect, alone or in combination with one or more of the first through sixth aspects, the indication is transmitted to a UE associated with the second network node for relaying to the second network node.

In an eighth aspect, alone or in combination with one or more of the first through seventh aspects, the indication is transmitted via at least one of downlink control information or a downlink medium access control (MAC) control element (MAC-CE), and the indication is configured to be relayed via uplink control information or an uplink MAC-CE from the UE.

In a ninth aspect, alone or in combination with one or more of the first through eighth aspects, the indication indicates at least one of a backoff power for the second network node, or one or more suggested beams for the second network node.

In a tenth aspect, alone or in combination with one or more of the first through ninth aspects, the UE is selected for relaying to the second network node based at least in part on the UE being preconfigured by the first network node to relay the indication.

In an eleventh aspect, alone or in combination with one or more of the first through tenth aspects, the UE is selected for relaying to the second network node based at least in part on the UE being associated with the second network node.

In a twelfth aspect, alone or in combination with one or more of the first through eleventh aspects, the UE is selected for relaying to the second network node based at least in part on the UE being in a coverage range of the second network node.

In a thirteenth aspect, alone or in combination with one or more of the first through twelfth aspects, the UE is selected for relaying to the second network node based at least in part on the UE being associated with less than a threshold traffic level during the time window.

In a fourteenth aspect, alone or in combination with one or more of the first through thirteenth aspects, the indication indicates the second network node based at least in part on at least one of a reference signal sequence or an identifier of the second network node.

In a fifteenth aspect, alone or in combination with one or more of the first through fourteenth aspects, the first network node is a victim of interference associated with the second network node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
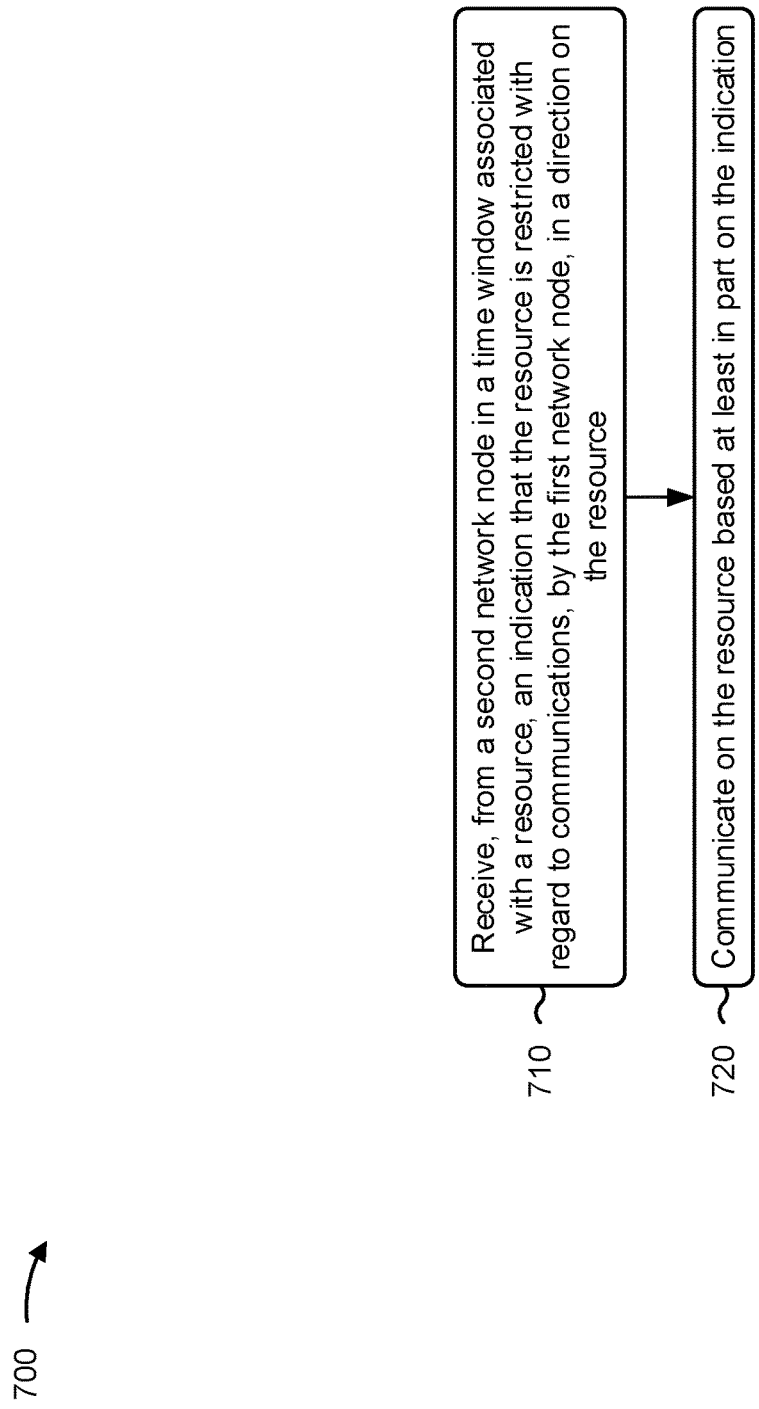

FIG. 7 is a diagram illustrating an example process 700 performed, for example, by a network node, in accordance with the present disclosure. Example process 700 is an example where a first network node (e.g., base station 110, base station 304, the second network node of FIG. 5) performs operations associated with techniques for signaling a restricted resource.

As shown in FIG. 7, in some aspects, process 700 may include receiving, from a second network node in a time window associated with a resource, an indication that the resource is restricted with regard to communications, by the first network node, in a direction on the resource (block 710). For example, the first network node (e.g., using communication manager 150 and/or reception component 902, depicted in FIG. 9) may receive, from a second network node in a time window associated with a resource, an indication that the resource is restricted with regard to communications, by the first network node, in a direction on the resource, as described above.

As further shown in FIG. 7, in some aspects, process 700 may include communicating on the resource based at least in part on the indication (block 720). For example, the first network node (e.g., using communication manager 150 and/or transmission component 904, depicted in FIG. 9) may communicate on the resource based at least in part on the indication, as described above.

Process 700 may include additional aspects, such as any single aspect or any combination of aspects described below and/or in connection with one or more other processes described elsewhere herein.

In a first aspect, the indication is a reference signal.

In a second aspect, alone or in combination with the first aspect, the indication indicates an identifier of the second network node.

In a third aspect, alone or in combination with one or more of the first and second aspects, the time window is specific to the second network node.

In a fourth aspect, alone or in combination with one or more of the first through third aspects, the time window is common to a plurality of nodes including the second network node.

In a fifth aspect, alone or in combination with one or more of the first through fourth aspects, process 700 includes receiving another indication indicating that the resource can be used for full-duplex communication.

In a sixth aspect, alone or in combination with one or more of the first through fifth aspects, process 700 includes performing full-duplex communication on the resource based at least in part on a length of time elapsing after receiving the indication.

In a seventh aspect, alone or in combination with one or more of the first through sixth aspects, the indication is relayed from the second network node via a UE.

In an eighth aspect, alone or in combination with one or more of the first through seventh aspects, the indication is received via at least one of uplink control information or a MAC-CE.

In a ninth aspect, alone or in combination with one or more of the first through eighth aspects, the indication indicates at least one of a backoff power for the first network node, or one or more suggested beams for the first network node.

In a tenth aspect, alone or in combination with one or more of the first through ninth aspects, the indication indicates the first network node based at least in part on at least one of a reference signal sequence or an identifier of the first network node.

In an eleventh aspect, alone or in combination with one or more of the first through tenth aspects, the second network node is a victim of interference associated with the first network node.

In a twelfth aspect, alone or in combination with one or more of the first through eleventh aspects, the indication is received via a backhaul connection with the second network node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
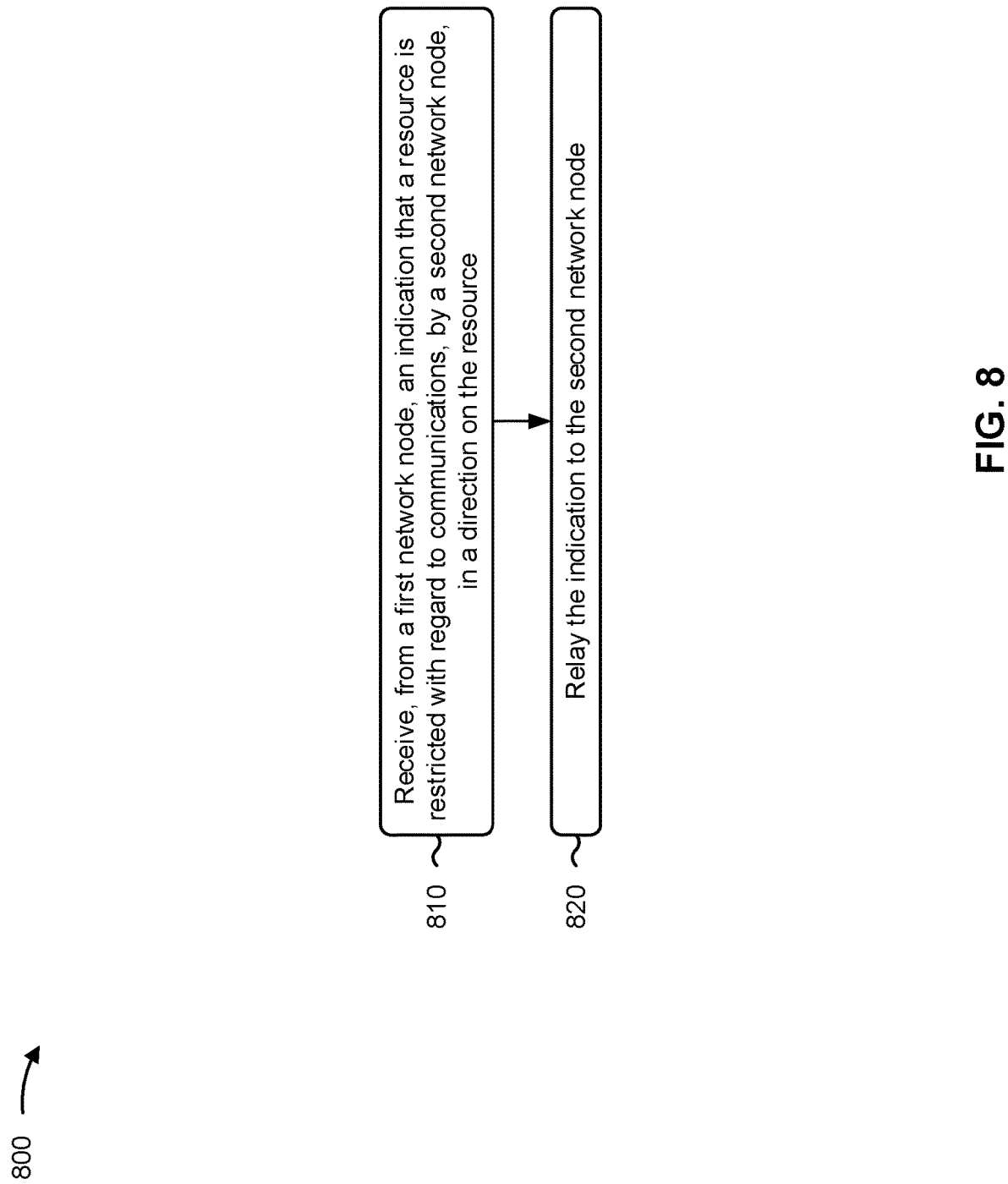
FIG. 8 is a diagram illustrating an example process performed, for example, by a network node, in accordance with the present disclosure.

FIG. 8 is a diagram illustrating an example process 800 performed, for example, by a UE, in accordance with the present disclosure. Example process 800 is an example where the UE (e.g., UE 120) performs operations associated with techniques for signaling a restricted resource.

As shown in FIG. 8, in some aspects, process 800 may include receiving, from a first network node, an indication that a resource is restricted with regard to communications, by a second network node, in a direction on the resource (block 810). For example, the UE (e.g., using communication manager 140 and/or reception component 1002, depicted in FIG. 10) may receive, from a first network node, an indication that a resource is restricted with regard to communications, by a second network node, in a direction on the resource, as described above.

As further shown in FIG. 8, in some aspects, process 800 may include relaying the indication to the second network node (block 820). For example, the UE (e.g., using communication manager 140 and/or transmission component 1004, depicted in FIG. 10) may relay the indication to the second network node, as described above.

Process 800 may include additional aspects, such as any single aspect or any combination of aspects described below and/or in connection with one or more other processes described elsewhere herein.

In a first aspect, relaying the indication to the second network node is based at least in part on a configuration of the UE by the first network node.

In a second aspect, alone or in combination with the first aspect, the indication is received via downlink control information.

In a third aspect, alone or in combination with one or more of the first and second aspects, the indication is relayed via uplink control information.

In a fourth aspect, alone or in combination with one or more of the first through third aspects, the indication is received via downlink medium access control signaling.

In a fifth aspect, alone or in combination with one or more of the first through fourth aspects, the indication is relayed via uplink medium access control signaling.

In a sixth aspect, alone or in combination with one or more of the first through fifth aspects, the indication is received and relayed within a time window associated with the resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
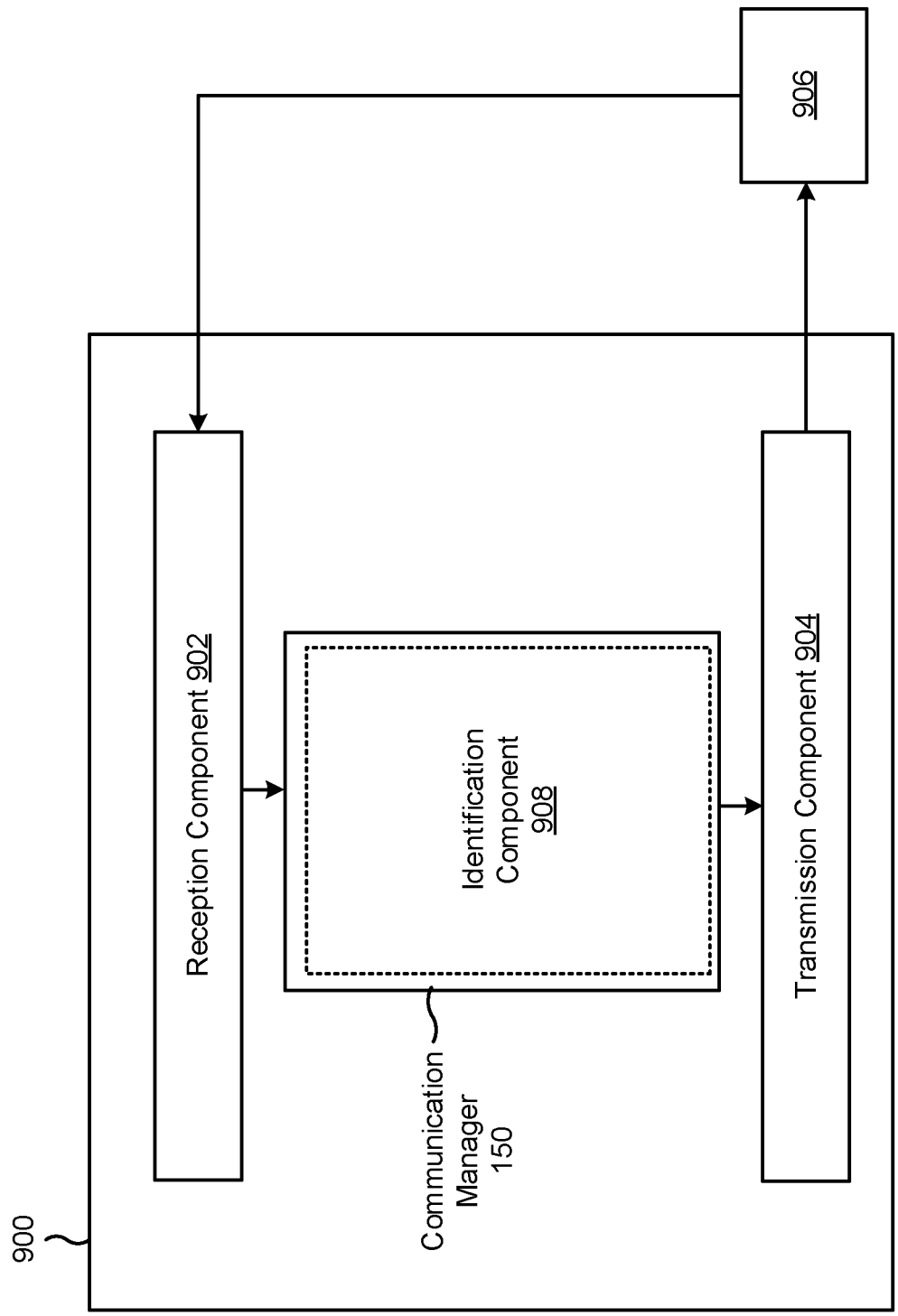
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node (e.g., a base station), or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of an identification component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The identification component 908 may identify interference associated with a first direction on a resource. The transmission component 904 may transmit, to a second network node in a time window associated with the resource, an indication that the resource is restricted with regard to communications, by the second network node, in a second direction on the resource, wherein the second direction is opposite the first direction. The transmission component 904 may communicate based at least in part on the indication.

The identification component 908 may perform an interference measurement on the resource, wherein identifying the interference is based at least in part on the interference measurement.

The transmission component 904 may transmit another indication indicating that the resource can be used for the communications in the second direction.

The reception component 902 may receive, from a second network node in a time window associated with a resource, an indication that the resource is restricted with regard to communications, by the first network node, in a direction on the resource. The transmission component 904 may communicate on the resource based at least in part on the indication.

The reception component 902 may receive another indication indicating that the resource can be used for full-duplex communication.

The transmission component 904 may perform full-duplex communication on the resource based at least in part on a length of time elapsing after receiving the indication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
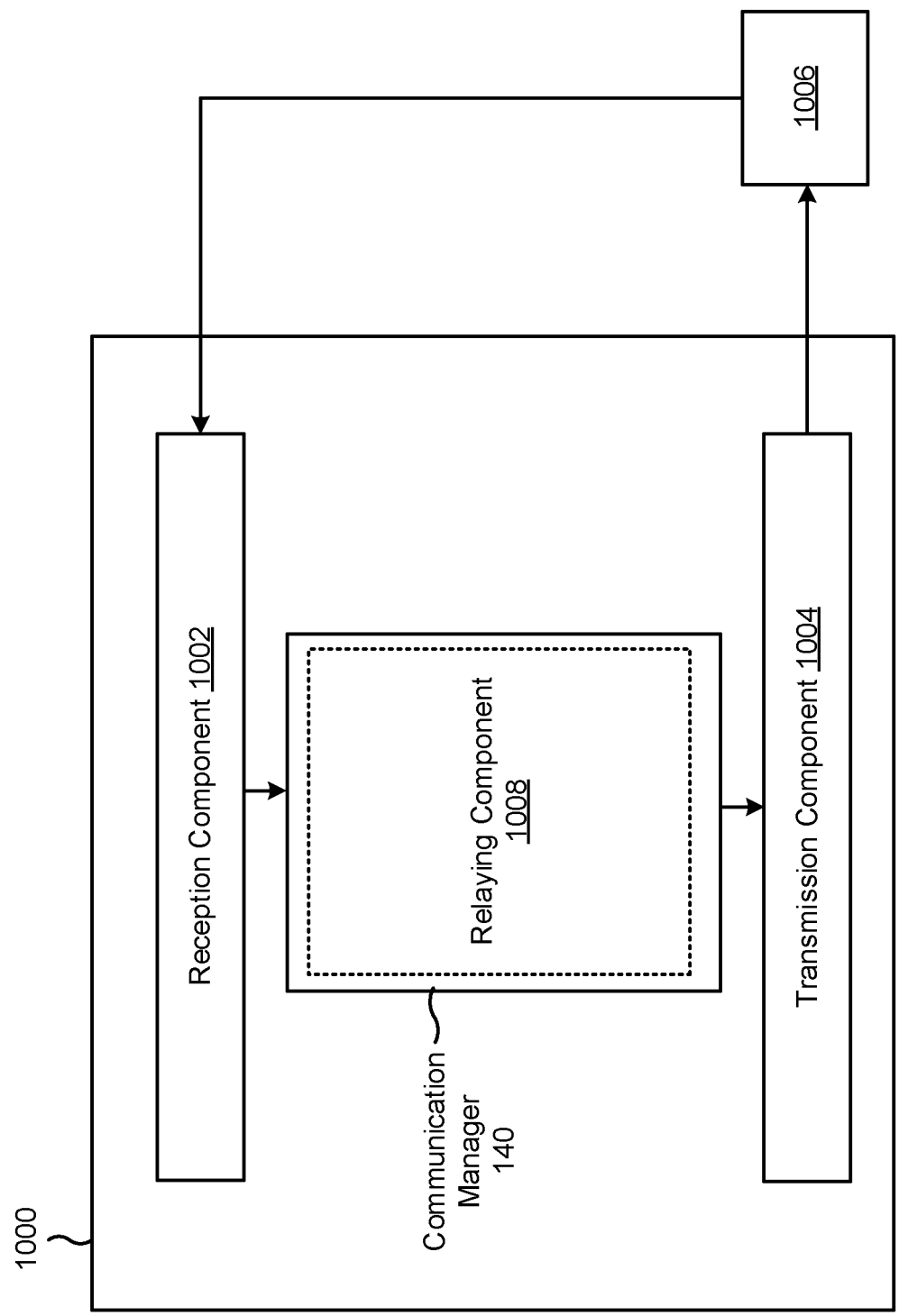
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a relaying component 1008, among other examples.

In some aspects, the apparatus 1000 may be configured to perform one or more operations described herein in connection with FIGS. 3-5. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a first network node, an indication that a resource is restricted with regard to communications, by a second network node, in a direction on the resource. The transmission component 1004 or the relaying component 1008 may relay the indication to the second network node.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first network node, comprising: identifying interference associated with a first direction on a resource; transmitting, to a second network node in a time window associated with the resource, an indication that the resource is restricted with regard to communications, by the second network node, in a second direction on the resource, wherein the second direction is opposite the first direction; and communicating based at least in part on the indication.

Aspect 2: The method of Aspect 1, further comprising: performing an interference measurement on the resource, wherein identifying the interference is based at least in part on the interference measurement.

Aspect 3: The method of any of Aspects 1-2, wherein the indication is a reference signal.

Aspect 4: The method of any of Aspects 1-3, wherein the indication indicates an identifier of the first network node.

Aspect 5: The method of any of Aspects 1-4, wherein the time window is specific to the first network node.

Aspect 6: The method of any of Aspects 1-4, wherein the time window is common to a plurality of nodes that includes the first network node.

Aspect 7: The method of any of Aspects 1-6, further comprising transmitting another indication indicating that the resource can be used for the communications in the second direction.

Aspect 8: The method of any of Aspects 1-7, wherein the indication is transmitted to a user equipment (UE) associated with the second network node for relaying to the second network node.

Aspect 9: The method of Aspect 8, wherein the indication is transmitted via at least one of downlink control information or a downlink medium access control (MAC) control element (MAC-CE), and wherein the indication is configured to be relayed via uplink control information or an uplink MAC-CE from the UE.

Aspect 10: The method of Aspect 9, wherein the indication indicates at least one of: a backoff power for the second network node, or one or more suggested beams for the second network node.

Aspect 11: The method of Aspect 8, wherein the UE is selected for relaying to the second network node based at least in part on the UE being preconfigured by the first network node to relay the indication.

Aspect 12: The method of Aspect 8, wherein the UE is selected for relaying to the second network node based at least in part on the UE being associated with the second network node.

Aspect 13: The method of Aspect 8, wherein the UE is selected for relaying to the second network node based at least in part on the UE being in a coverage range of the second network node.

Aspect 14: The method of Aspect 8, wherein the UE is selected for relaying to the second network node based at least in part on the UE being associated with less than a threshold traffic level during the time window.

Aspect 15: The method of any of Aspects 1-14, wherein the indication indicates the second network node based at least in part on at least one of a reference signal sequence or an identifier of the second network node.

Aspect 16: The method of any of Aspects 1-15, wherein the first network node is a victim of interference associated with the second network node.

Aspect 17: A method of wireless communication performed by a first network node, comprising: receiving, from a second network node in a time window associated with a resource, an indication that the resource is restricted with regard to communications, by the first network node, in a direction on the resource; and communicating on the resource based at least in part on the indication.

Aspect 18: The method of Aspect 17, wherein the indication is a reference signal.

Aspect 19: The method of any of Aspects 17-18, wherein the indication indicates an identifier of the second network node.

Aspect 20: The method of any of Aspects 17-19, wherein the time window is specific to the second network node.

Aspect 21: The method of any of Aspects 17-19, wherein the time window is common to a plurality of nodes including the second network node.

Aspect 22: The method of any of Aspects 17-21, further comprising receiving another indication indicating that the resource can be used for full-duplex communication.

Aspect 23: The method of any of Aspects 17-22, further comprising performing full-duplex communication on the resource based at least in part on a length of time elapsing after receiving the indication.

Aspect 24: The method of any of Aspects 17-23, wherein the indication is relayed from the second network node via a user equipment (UE).

Aspect 25: The method of Aspect 24, wherein the indication is received via at least one of uplink control information or a medium access control (MAC) control element (MAC-CE).

Aspect 26: The method of Aspect 25, wherein the indication indicates at least one of: a backoff power for the first network node, or one or more suggested beams for the first network node.

Aspect 27: The method of Aspect 17, wherein the indication indicates the first network node based at least in part on at least one of a reference signal sequence or an identifier of the first network node.

Aspect 28: The method of any of Aspects 17-27, wherein the second network node is a victim of interference associated with the first network node.

Aspect 29: The method of any of Aspects 17-28, wherein the indication is received via a backhaul connection with the second network node.

Aspect 30: A method of wireless communication performed by a user equipment (UE), comprising: receiving, from a first network node, an indication that a resource is restricted with regard to communications, by a second network node, in a direction on the resource; and relaying the indication to the second network node.

Aspect 31: The method of Aspect 30, wherein relaying the indication to the second network node is based at least in part on a configuration of the UE by the first network node.

Aspect 32: The method of any of Aspects 30-31, wherein the indication is received via downlink control information.

Aspect 33: The method of any of Aspects 30-32, wherein the indication is relayed via uplink control information.

Aspect 34: The method of any of Aspects 30-31, wherein the indication is received via downlink medium access control signaling.

Aspect 35: The method of any of Aspects 30-31 or 34, wherein the indication is relayed via uplink medium access control signaling.

Aspect 36: The method of any of Aspects 30-35, wherein the indication is received and relayed within a time window associated with the resource.

Aspect 37: An apparatus for wireless communication at a device, comprising a processor; memory coupled with the processor; and instructions stored in the memory and executable by the processor to cause the apparatus to perform the method of one or more of Aspects 1-36.

Aspect 38: A device for wireless communication, comprising a memory and one or more processors coupled to the memory, the one or more processors configured to perform the method of one or more of Aspects 1-36.

Aspect 39: An apparatus for wireless communication, comprising at least one means for performing the method of one or more of Aspects 1-36.

Aspect 40: A non-transitory computer-readable medium storing code for wireless communication, the code comprising instructions executable by a processor to perform the method of one or more of Aspects 1-36.

Aspect 41: A non-transitory computer-readable medium storing a set of instructions for wireless communication, the set of instructions comprising one or more instructions that, when executed by one or more processors of a device, cause the device to perform the method of one or more of Aspects 1-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first network node, comprising:
   identifying interference associated with a first direction on a resource;
   transmitting, to a second network node in a time window associated with the resource, an indication that the resource is restricted with regard to communications, by the second network node, in a second direction on the resource, wherein the second direction is opposite the first direction, wherein the indication is a reference signal; and
   communicating based at least in part on the indication.

2. The method of claim 1, further comprising:
   performing an interference measurement on the resource, wherein identifying the interference is based at least in part on the interference measurement.

3. The method of claim 1, wherein the indication indicates an identifier of the first network node.

4. The method of claim 1, wherein the time window is specific to the first network node.

5. The method of claim 1, wherein the time window is common to a plurality of nodes that includes the first network node.

6. The method of claim 1, further comprising transmitting another indication indicating that the resource can be used for communications in the second direction.

7. The method of claim 1, wherein the indication is transmitted to a user equipment (UE) associated with the second network node for relaying to the second network node.

8. The method of claim 7, wherein the indication is transmitted via at least one of downlink control information or a downlink medium access control (MAC) control element (MAC-CE), and wherein the indication is configured to be relayed via uplink control information or an uplink MAC-CE from the UE.

9. The method of claim 8, wherein the indication indicates at least one of:
   a backoff power for the second network node, or
   one or more suggested beams for the second network node.

10. The method of claim 7, wherein the UE is selected for relaying to the second network node based at least in part on the UE being preconfigured by the first network node to relay the indication.

11. The method of claim 7, wherein the UE is selected for relaying to the second network node based at least in part on the UE being associated with the second network node.

12. The method of claim 7, wherein the UE is selected for relaying to the second network node based at least in part on the UE being in a coverage range of the second network node.

13. The method of claim 7, wherein the UE is selected for relaying to the second network node based at least in part on the UE being associated with less than a threshold traffic level during the time window.

14. The method of claim 1, wherein the indication indicates the second network node based at least in part on at least one of a reference signal sequence or an identifier of the second network node.

15. The method of claim 1, wherein the first network node is a victim of interference associated with the second network node.

16. A method of wireless communication performed by a first network node, comprising:
   receiving, from a second network node in a time window associated with a resource, an indication that the resource is restricted with regard to communications, by the first network node, in a direction on the resource, wherein the indication is a reference signal; and
   communicating on the resource based at least in part on the indication.

17. The method of claim 16, wherein the indication indicates an identifier of the second network node.

18. The method of claim 16, wherein the time window is specific to the second network node.

19. The method of claim 16, wherein the time window is common to a plurality of nodes including the second network node.

20. The method of claim 16, further comprising receiving another indication indicating that the resource can be used for full-duplex communication.

21. The method of claim 16, further comprising performing full-duplex communication on the resource based at least in part on a length of time elapsing after receiving the indication.

22. The method of claim 16, wherein the indication is relayed from the second network node via a user equipment (UE).

23. The method of claim 22, wherein the indication is received via at least one of uplink control information or a medium access control (MAC) control element (MAC-CE).

24. The method of claim 23, wherein the indication indicates at least one of:
a backoff power for the first network node, or
one or more suggested beams for the first network node.

25. The method of claim 16, wherein the indication indicates the first network node based at least in part on at least one of a reference signal sequence or an identifier of the first network node.

26. A method of wireless communication performed by a user equipment (UE), comprising:
receiving, from a first network node, an indication that a resource is restricted with regard to communications, by a second network node, in a direction on the resource, wherein the indication is a reference signal; and
relaying the indication to the second network node.

27. The method of claim 26, wherein relaying the indication to the second network node is based at least in part on a configuration of the UE by the first network node.

28. An apparatus for wireless communication at a first network node, comprising:
one or more memories; and
one or more processors, coupled to the one or more memories, configured to:
identify interference associated with a first direction on a resource;
transmit, to a second network node in a time window associated with the resource, an indication that the resource is restricted with regard to communications, by the second network node, in a second direction on the resource, wherein the second direction is opposite the first direction, wherein the indication is a reference signal; and
communicate based at least in part on the indication.

* * * * *